United States Patent [19]

Burrows

[11] 4,327,407
[45] Apr. 27, 1982

[54] DATA DRIVEN PROCESSOR

[75] Inventor: James L. Burrows, Merrimack, N.H.

[73] Assignee: Sanders Associates, Inc., Nashua, N.H.

[21] Appl. No.: 15,278

[22] Filed: Feb. 26, 1979

[51] Int. Cl.³ .......................... G06F 9/30; G11C 15/00
[52] U.S. Cl. ................................................... 364/200
[58] Field of Search ... 364/200 MS File, 900 MS File; 365/49, 50

[56] References Cited

U.S. PATENT DOCUMENTS 3,391,394 7/1968 Ottaway et al. .................... 364/200
3,681,762 8/1972 Minshull et al. .................... 364/200

Primary Examiner—Gareth D. Shaw
Assistant Examiner—Thomas M. Heckler
Attorney, Agent, or Firm—Louis Etlinger; Ronald Reichman

[57] ABSTRACT

A data driven processor for searching data stored in memory to identify messages or other data containing operator selected keywords containing alpha-numeric or other characters and for performing arithmetic and other functions performed by processors. The processor comprises a plurality of commercially available integrated circuit random access memories (RAMs). The binary words read out of the RAMs are applied to the higher order addressing inputs of the same RAMs. Messages being searched for keywords are applied to the lower order addressing inputs of the same RAMs. A binary word applied to the higher order addressing inputs of the RAM memory selects a block of memory bits with each bit being associated with a different character. Only the memory bit within a selected block of memory bits corresponding to the keyword character being searched for contains a binary word indicating the block of bits for the subsequent keyword character to be searched for. When a character being searched for is detected, the binary word in the corresponding memory location is read out and applied to the higher order memory inputs. This causes the next block of memory bits to be addressed to await receipt and detection of the next keyword character. After detecting all the characters of a keyword or keywords an output from the RAM memory is used to transfer the stored message containing the selected keyword or words to the output device for operator review.

3 Claims, 1 Drawing Figure

DATA DRIVEN PROCESSOR

FIELD OF THE INVENTION

The present invention relates to data processing equipment and more particularly, to data driven and associative processor equipment.

BACKGROUND OF THE INVENTION

Associative processors having content-addressable memories are special purpose computers typically used in conjunction with general purpose digital computers to handle tasks that are very time-consuming to the digital computer, but which can be handled efficiently by the associative processor. Thus, associative processors augment digital computers to provide more data processing throughput without complete system redesign. One application of associative processors, which is only one of the uses described herein, is to function with large capacity or bulk memories for document retrieval and file searching.

It is an object of this invention to provide a data driven processor that can operate as an associative processor for document retrieval and file searching.

It is another object of this invention to provide a data driven processor that can perform arithmetic functions, limit searching and other functions performed by processors.

It is yet another object of this invention to provide a data driven processor made up of commercially available random access memory (RAM) integrated circuits and utilizing little additional circuitry.

It is still another object of this invention to provide a data driven processor that can operate as an associative processor that is used to locate any one of a specified group of words and/or characters, or to locate a specific sequence of words and/or alpha-numeric characters within stored messages and data.

SUMMARY OF THE INVENTION

According to a preferred embodiment of my invention I provide a data driven processor comprising a register and a multiplicity of commercially available random access memory (RAM) integrated circuits having their addressing inputs interconnected in parallel, and their outputs combined in parallel to form a buss which is connected to the register which stores words read out of the RAMs. The contents of the register are connected to the higher order addressing inputs of the RAMs thereby making them content addressable. The contents of another large capacity or bulk memory in which is stored messages or other data are applied via an appropriate interface to a buffer store and then applied to the lower order addressing inputs of the RAMs. Multi-bit binary words are stored in the RAMs, with one bit in each RAM, depending upon the keyword or words to be searched for in the stored messages. There is one stored binary word for each character of the keywords being searched for. The first bit of each stored multi-bit binary word is stored within a particular bit position of the first RAM, the second bit of the same multi-bit binary word is stored in the same bit position in the second RAM, the third bit of the multibit binary is stored in the same bit position of the third RAM and so on. When an address made up of the higher order and lower order address bits is applied to the parallel interconnected inputs of all the RAMs, the particular bit in each RAM is addressed and the multi-bit word stored therein is output in parallel from the RAMs.

Initially, the binary word comprising all zeros is output from the RAMs and stored in the register which is connected to the RAM outputs, Therefore, the higher ordered addressing inputs to the RAMs, which are connected to the output of the register, are all zeros. When the binary word for a character not being searched for in a keyword is applied to the lower order addressing inputs of the RAMs, the output from each RAM still remains a zero. Upon a desired keyword character being applied to the lower order addressing inputs of the RAMs there is a binary output signal having other than all zeros which is then stored in the output register by overwriting and, as briefly described heretofore, is then applied to the higher order addressing inputs of the same RAMs. Upon the subsequent detection of a character, other than the character being searched for, the output from the RAMs returns to all zeros which causes the higher order addressing input bits to return to zero. The processor then recommences searching for the first character of the keywod being searched for. In the event that the second character of a keyword being searched for is applied to the lower order addressing inputs immediately following the first character there will be another binary word output from the RAMs which prepares the RAMs to look for the third character in the keyword. This binary number applied to the higher order addressing inputs of the RAMs necessarily defines a block of memory locations, each memory location of which is identified or associated with one of a multiplicity of alpha-numeric or other characters that can be recognized by the processor. In this manner the associative processor performs a processing function normally performed by specialized aggregates of standard digital inter-connected circuits.

Arithmetic operations such as adding and subtracting lists of numbers may also be performed. In this operation the contents read out of the RAMs is not fed back via a register and applied to addressing inputs of the same RAMs as in the keyword search mode. Instead a first list of binary numbers is applied to a first portion of the adressing inputs of the RAMs while a second list of binary numbers, to be added or subtracted to the first list, is applied to the remainder of the addressing inputs of the RAMs. The contents of the memory at the address made up of a binary number in each of the first and second lists is the sum or difference of the two binary numbers making up the address.

Another mode of operation is limit searching wherein numbers are checked to determine if they fall within or without preprogrammed upper and lower numerical bounds. This mode of operation is a variation of multiple and alternative keyword searching where numbers are checked digit by digit starting with the highest order digit to determine if the number is within the specified limits.

BRIEF DESCRIPTION OF DRAWINGS

The invention will be better understood upon reading the following detailed description in conjunction with the drawings in which.

DETAILED DESCRIPTION

Figure 1:
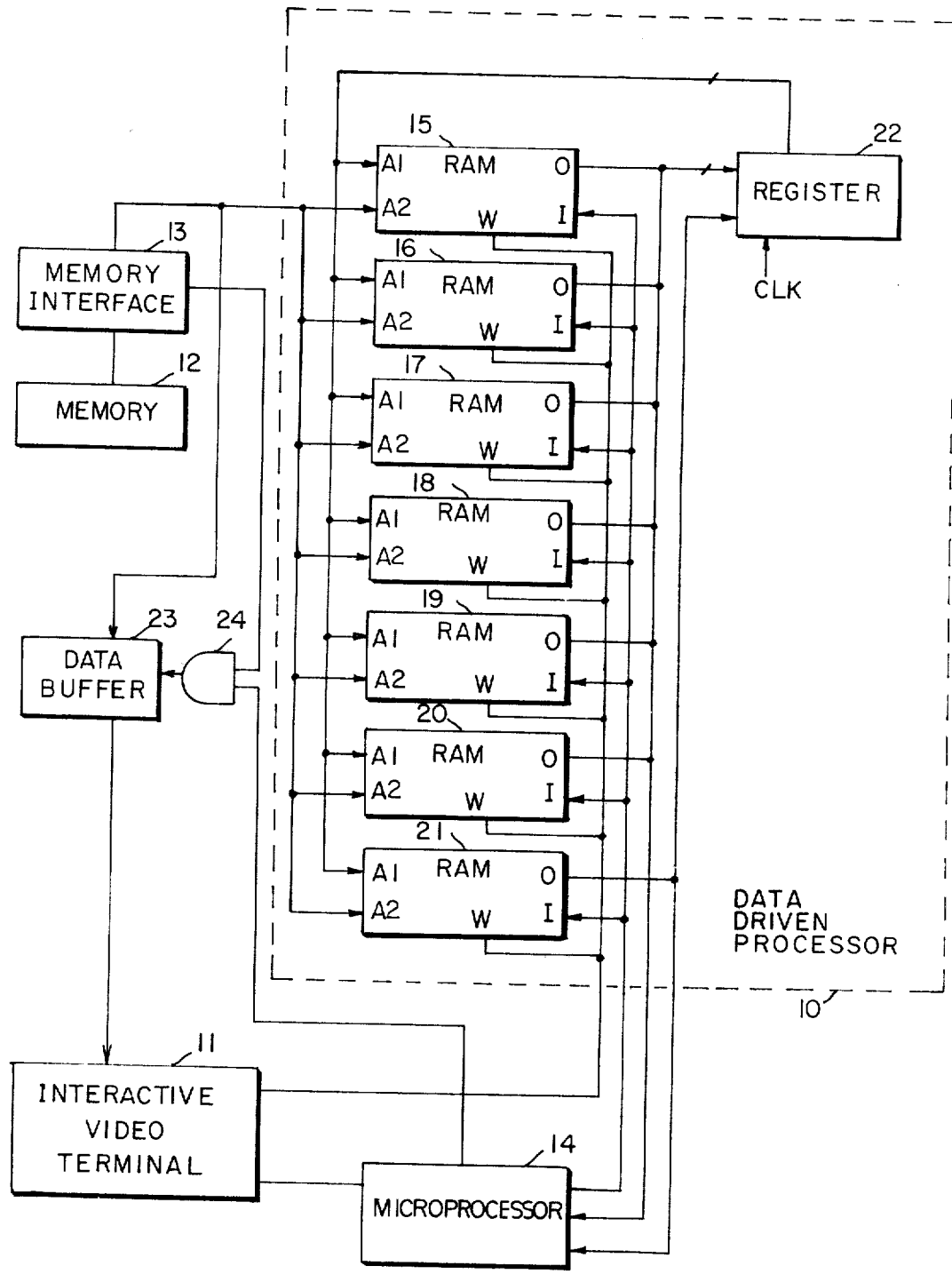
FIG. 1 is a detailed block diagram of my novel data driven processor utilized to locate keywords within stored messages and to perform other functions such as arithmetic operations.

Referring now to FIG. 1, therein is shown my novel processor 10 operating as an associative processor and utilized by an operator having control via an interactive video terminal 11 to perform many functions including searching for operator selected keywords contained in messages stored in memory 12. Memory 12 is advantageously a relatively large capacity or bulk memory used to store a large quantity of randomly acquired and stored information to be later sorted or searched for specific information identifiable by keywords made up of alpha-numeric or other characters. Stored messages containing the selected keywords are identified and then transferred via data buffer 23 to terminal 11 and stored therein for display and review by the operator.

Initially, data or messages, which may be structured or unstructured, are stored in memory 12 via memory interface 13. The original source of the messages is not shown in FIG. 1 and is not part of this invention. The messages stored within memory 12 are to be searched for the presence of one or more individual keywords, or the presence of specified sequentially ordered keywords made up of alpha-numeric and/or other characters. These keywords are selected by the operator utilizing interactive video terminal 11. The operator inputs the keywords to the system via a device such as a keyboard (not shown) which is commonly part of an interactive video display terminal 11. Microprocessor 14 may be an integral part of terminal 11 as found in many intelligent terminals available on the commercial market, or the microprocessor 11 may be separate as shown in FIG. 1 for discussion purposes only. Microprocessor 14 is easily programmed by one skilled in the art to take the keyword characters input by the operator at terminal 11 and generate a binary word for each alpha-numeric or other character of the keyword(s) and cause same to be stored in an appropriate location of the associative processor 10 memory comprising RAMs 15 through 21.

Before continuing with the description of the operation of processor 10, an understanding of how binary words are generated and stored within RAMs 15 through 21 to cause the desired operation is essential.

TABLE 1

| 0 | 000000 | M | 011001 |
|---|---|---|---|
| 1 | 000001 | N | 011010 |
| 2 | 000010 | O | 011011 |
| 3 | 000011 | P | 011100 |
| 4 | 000100 | Q | 011101 |
| 5 | 000101 | R | 011110 |
| 6 | 000110 | S | 011111 |
| 7 | 000111 | T | 100000 |
| 8 | 001000 | U | 100001 |
| 9 | 001001 | V | 100010 |
| Delimiter | 001100 | W | 100011 |
| A | 001101 | X | 100100 |
| B | 001110 | Y | 100101 |
| C | 001111 | Z | 100110 |
| D | 010000 | / | 100111 |
| E | 010001 | * | 101000 |
| F | 010010 | . | 101001 |
| G | 010011 | $ | 101010 |
| H | 010100 | ( | 101011 |
| I | 010101 | ) | 101100 |
| J | 010110 | , | 101101 |
| K | 010111 | ; | 101110 |
| L | 011000 | : | 101111 |

Looking at Table 1 immediately hereinabove, therein is shown one possible list of forty-six alpha-numeric and other characters to be searched for within messages stored within memory 12. This list is not inclusive and any conceivable character, including characters of Cyrillic, Chinese or Hebrew alphabets may be searched for. All that is necessary is that whatever character that is to be searched for be assigned a binary number. Advantageously, these binary numbers are one digit increments as shown in Table 1. Using six bit binary numbers will allow sixty-four different characters to be searched for as is recognized by one skilled in the art. If more than sixty-four characters are required to be searched for, a seven bit binary number may be utilized which will yield one hundred twenty-eight binary number combinations. As characters of messages are read out of memory 12 to be checked, it is the binary numbers representing the characters that are being input in parallel format to the six lower-order address bits A2 of each of RAMs 15 through 21 of processor 10 as shown in FIG. 1. At the same time there is only one output bit from each of RAMs 15 through 20 which are combined in a parallel format to make up a six bit binary word which is input to buffer register 22 to be temporarily stored therein. It is this six bit binary number temporarily stored in register 22 that is applied to the six higher order address bits A1 of RAMs 15 through 21. Address inputs A1 and A2 of RAMs 15 through 21 are all connected in parallel. Therefore, a single address is applied to all RAMs. The total of 12 addressing bits A1 and A2 of RAMs 15 through 21 address the 4096 bits of memory within each of RAMs 15 through 21.

The binary words written into selected memory locations of RAMs 15 through 21 by microprocessor 14 are the six bit binary numbers shown in the Address A1 column of Table 2. It should be noted that these six bit binary numbers are simple one-digit increments of one from the other. Each of these binary words stored in RAMs 15 through 20 and sequentially read out as a keyword is detected and is applied to the higher order addressing inputs A1 of all RAMs via register 22. Being applied to the higher order addressing inputs A1 each of these six bit binary words will identify a block of sixty four bits in each RAM. Thus, the six bit binary word read out of one block of memory bits will identify the next block of sixty-four memory bits.

As mentioned previously, the six higher order addressing bits designate a block of sixty-four bits in each of RAMs 15 through 21. Thus when address A1 is 000001, RAM memory locations 1 through 64 are addressed; when the A1 address is 000010 RAM memory locations 65 through 128 are addressed; when the A1 address is 000011 locations 129 through 192 are addressed; when the A1 address is 000100 locations 193 through 256 are addressed; when the A1 address is 000101 locations 257 through 320 are addressed, and so on.

A delimiter character is first searched for and in the block memory bits 1 through 64. The delimiter character is represented by the binary word 001100 which, in a manner well known in the art, has a decimal value of twelve. That is derived from adding up a number associated with each "one" in the twelve bit address binary word with the lowest order binary bit having a value of 1, the next highest order bit having a value of 2, the third higher order bit having a value of 4 and so on through the values 8, 16, 32, 64 etc. Thus, the two "ones" in the binary word 001100 for the delimiter have the values 4 and 8 which are summed to get 12 which is the memory bit in each of RAMs 15 through 21 for the first block of sixty four bits in the RAM memory. This is reflected in Table 2. Similarly, the letter J, of the keyword JOHN, will be associated with the second block of sixty-four bits in RAMs 15 through 21. The letter J is represented by the binary word 010110 as shown in Table 1. With the previously described numerical weight technique, the numbers 2, 4 and 16 are added together to get 22 and this in turn summed with 64 from the higher order Address A1 to get 86. Memory location 86 is within the second block of sixty-four bits and is the only bit therein associated with the letter J. Memory bit location 87 will be for the letter K, location 88 for the letter L and so on.

With the sequential binary numbers under the Address A1 columns which correspond to sequential characters, including delimiter characters, of a keyword or keywords, as shown in Table 2, and with the binary numbers assigned to each character as shown in Table 1, it can be seen that it is a relatively easy task to program microprocessor 14 to write the sequential binary numbers of Address A1 in the appropriate bits of each block of sixty-four bits of the RAMs. Within each block of memory there is a bit assigned to each of the characters in Table 1. As the A1 addresses are sequential binary words as mentioned previously, blocks of memory are sequentially addressed by the outputs from the RAM memory which are the sequential binary words. When a particular block of memory bits is reached only the bit(s) in each of RAMs 15 through 20 associated with the next keyword character or characters to be received can have a binary word written therein. All other bits will be zeros.

TABLE 2

| Character | Address A1 | Address A2 | Memory Location | Memory Contents | Last RAM |
|---|---|---|---|---|---|
| Delimiter | 000000 | 001100 | 12 | 000001 | 0 |
| J | 000001 | 010110 | 86 | 000010 | 0 |
| O | 000010 | 011011 | 155 | 000011 | 0 |
| H | 000011 | 010100 | 222 | 000100 | 0 |
| N | 000100 | 011010 | 282 | 000101 | 0 |
| Delimiter | 000101 | 001100 | 332 | 000110 | 0 |
| D | 000110 | 010000 | 400 | 000111 | 0 |
| O | 000111 | 011011 | 475 | 001000 | 0 |
| E | 001000 | 010001 | 529 | 001001 | 0 |
| Delimiter | 001001 | 001100 | 588 | 001010 | 0 |
| A | 001010 | 001101 | 653 | 001011 | 0 |
| T | 001011 | 100000 | 736 | 001100 | 0 |
| 6 | 001100 | 000110 | 774 | 001101 | 0 |
| 3 | 001101 | 000011 | 835 | 001110 | 0 |
| 7 | 001110 | 000111 | 903 | 001111 | 0 |
| 4 | 001111 | 000100 | 964 | 010000 | 0 |
| N | 010000 | 011010 | 1050 | 010001 | 0 |
| Delimiter | 010001 | 001100 | 1100 | 000001 | 1 |

For example, with reference to Table 2, after the receipt of the letter O in the keyword JOHN, the binary word 000011 is read out of RAMs 15 through 20 and is stored in register 22 and then applied to the higher order addressing inputs A1 of the RAMS 15 through 21. This binary word 000011 indicates the next block of memory bits within each of RAMs 15 through 21. Within the said next block of memory bits the specific bit associated with the letter H is the only bit in each RAM that will have anything written therein in order to recognize only the letter H for the next character to be received after the letters JO. Specifically, in the specific bits associated with the letter H, in RAMs 15, 16, 17, 19 and 20 are zeros while a 1 is written into the specific bit of RAM 18. Thus, if the next binary word applied to lower order addressing inputs A2 of RAMs 15 through 21 is 010100, representing the letter H, the binary word 000100 is read out of RAMs 15 through 20. This binary word 000100 overwrites the previous contents of register 22 and is applied to the higher order addressing inputs A1 of RAMs 15 through 21. If any other character other then the letter H is the next character received, the binary word 000000 is read out of RAMs 15 through 20. As a result, the higher order addressing input A1 has a 000000 input thereto, as represented by the top entry of the address A1 column of Table 2, and processor 10 recommences looking for the delimiter character represented by the binary word 001100 being applied to the lower order addressing inputs A2 of RAMs 15 through 21.

In a brief summary, microprocessor 14 causes the sequentially ordered binary numbers under the Memory Contents column of Table 2 to be written into specific bits of each block of bits of RAMs 15 through 20 in correspondence with the keyword to be detected. These sequentially ordered binary numbers are sequentially read out of RAMs 15 through 20 only when the designated keyword or keywords are read out of memory 12 and input to RAMs 15 through 20 of processor 10.

I now completely describe the operation of processor 10 programmed via microprocessor 14 to detect the keywords JOHN DOE AT6374N, the example shown in Table 2. Initially, the binary word 000000 is written into register 22 and thereby applied to the higher order addressing inputs A1 of RAMs 15 through 21. This is represented by the 000000 at the first line of the Address A1 column of Table 2.

The processor must first detect a delimiter character represented by the binary word 001100 per Table 1. This is shown at the first line of the Address A2 column of Table 2. Accordingly, microprocessor 14 has written the binary word 000001 into the bits of RAMs 15 through 20 associated with the delimiter character in the first block of bits designated by the binary word 000000 at the Address A1 input of the RAMs. When the binary word for the delimiter character is applied to addressings inputs A2 the total of twelve binary bits under addressing column A1 and A2 identify memory location twelve within each of RAMs 15 through 21. In the memory location twelve of RAMs 15 through 20 is stored the six bit binary number 000001 as is shown under the Memory Contents column of Table 2. In the twelfth memory location of RAM 21 is stored a zero as reflected under the last RAM column of Table 2. RAMs 15 through 19 all contain zeros at their memory location twelve while the twelfth memory location of RAM 20 contains a one.

The six bit binary number 000001 output in parallel format from RAMs 15 through 20 in response to the binary word for a delimiter character overwrites the previous 000000 contents of register 22 under the control of the clocking signal CLK applied thereto. This six bit binary number 000001 in register 22 becomes the new address applied to higher order address input A1 of RAMs 15 through 21.

As shown in Table 2 alongside the letter J the Address A1 bits are 000001 as described in the last paragraph. If, and only if, the binary word for the next alpha-numeric or other character applied to the addressing input A2 of RAMs 15 through 21 is the binary word 010110 for the letter J, the twelve bit RAM address comprising addresses A1 and A2 on line two of Table 2 opposite the letter J will read out memory location 86 in each of RAMs 15 through 21. In the second group of memory bits indicated by the A1 address 000001, all memory locations except location 86 have 000000 written therein. Location 86 has 000010 written therein as shown in Table 2. Last RAM 21 has a zero written therein as reflected in Table 2.

The binary word 000010 read out of the eighty-sixth memory location of RAMs 15 through 20 overwrites the previous contents of register 22 and is stored therein. This same binary number is applied via register 22 to the higher order addressing inputs A1 of RAMs 15 through 21 as reflected in Table 2 opposite the letter O. Upon the next received alpha-numeric character being the letter O represented only by the binary number 011011 shown under the Address A2 column opposite the letter O, the twelve bit address comprised of A1 and A2 causes memory location 155 of RAMs 15 through 21 to be read out. The binary number 000011 is read out of RAMs 15 through 20 and overwrites the previous contents of register 22.

The previously described operation is repeated over and over for the subsequent letters in the keyword or words being searched for. In the particular example shown in Table 2, the key words sequentially being searched for are JOHN DOE AT6374N.

It can readily be recognized that many words have same letter sequences in common. The first keyword being searched for in the example shown in Table 2 is the word JOHN. Many words may be read out of memory 12 having the same first two letters of JO such as the word JOG. In this event, the letter H will not be in the third letter read out of memory 12. When the third letter is a letter other than H, a memory location other than memory location 222 in each of RAMs 15 through 21 will have their contents read out. In the third block of memory bits between memory locations 193 and 256, only location 222 has a word written therein. All other bits of the third block of memory location will have 000000 written therein. If, for example, the word being read out of memory 12 were the word JOG, the third letter to be read out would be the letter G rather than the letter H. The binary word for the letter G, as may be seen in Table 1, is 010011. Binary word 010011 applied to addressing input A2 coupled with the binary word 000011 applied to addressing input A1 will cause the contents of memory bit location 221 to be read out of each of RAMs 15 through 21. As the letter G is not the third letter of the keyword, the binary word 000000 is read out of memory location 221 to overwrite any previous binary number stored in register 222. The addressing input A1 of all RAMs is now 000000 and the system will recommence looking for a delimiter character and the search restarts at the first line of Table 2 and progresses in the manner just described.

The process described in the preceding paragraphs continues until the example key words JOHN DOE AT6374N are received exactly in that order along with the appropriate delimiter characters. When all keywords are properly received the letter N at the end of the keyword AT6374N is detected and the binary word 010001 content of memory location 1050 of RAMs 15 through 20 is read out. Binary word 010001 overwrites the previous contents of register 22 and becomes the higher order addressing input A1 to RAMs 15 through 21 as previously described. Upon the subsequent detection of a delimiter character represented by the binary word 001100 memory location 1100 of RAMs 15 through 20 is read out yielding the binary number 000001. Memory location 1100 of RAM 21 now contains a 1 indicating that the complete keyword or keywords have been detected in the message being read out of memory 12. Microprocessor 14 responds to the 1 read out of RAM 21 to cause the message containing the selected keyword or keywords to be forwarded via data buffer 23 to an interactive video terminal 11 to be displayed to the operator. This operation is described in greater detail in the next paragraph.

To accomplish message transfer subsequent to the recognition of a keyword or keywords therein, the system operates in the following manner. Memory interface 13 is responsive to messages read out of memory 12 recognizes signals therein indicating the beginning of each message and the end of each message. When the end of a message is detected, there is a signal from memory interface 13 to one of the two inputs of AND gate 24. Prior to the end of each message read out of memory 12 RAM 21 may provide the 1 output indicating that a keyword has been detected in the message presently being read out of memory 12. In response to this 1 output from RAM 21 microprocessor 14 generates a signal to the other of the two inputs of AND gate 24. Therefore, at the end of a message in which a keyword or words have been detected there is an output from AND gate 24 to data buffer 23. At the same time that information was being read out of memory 12 via memory interface 13 and applied to the lower order addressing inputs A2 of RAMs 15 through 21, the same message was being input to and stored in data buffer 23 as is shown in FIG. 1. At the end of each message if there is no output from AND gate 24 data buffer 23 dumps the message stored therein rather than transferring it to interactive video terminal 11. Data buffer 23 then stores the subsequent message read out of memory 12. However, upon there being an output from AND gate 24 indicating that a keyword or words have been detected within the message stored within data buffer 23, data buffer 23 responds to the output of AND gate 24 to transfer the message stored therein to video terminal 11 to be stored and displayed on command. The operator utilizing video terminal 11 may display the message that has been transferred to the terminal from buffer 23 to review the content of the message containing the keyword or words. The operator of terminal 11 may also utilize other equipment (not shown) adjunct to video terminals, such as page printers, to provide a hard copy output of messages containing keywords.

TABLE 3

| Character | Address A1 | Address A2 | Memory Location | Memory Contents | Last RAM |
|---|---|---|---|---|---|
| Delimiter | 000000 | 001100 | 12 | 000001 | 0 |
| F | 000001 | 010010 | 82 | 000010 | 0 |
| 1 | 000010 | 000001 | 129 | 000011 | 0 |
| 1 | 000011 | 000001 | 193 | 000100 | 0 |
| 6 | 000100 | 000110 | 262 | 000000 | 0 |
| Delimiter | 000000 | 001100 | 12 | 000001 | 1 |
| E | 000001 | 010001 | 81 | 000101 | 0 |
| C | 000101 | 001111 | 335 | 000110 | 0 |
| M | 000110 | 011001 | 409 | 000000 | 0 |
| Delimiter | 000000 | 001100 | 12 | 000001 | 1 |

In the example disclosed in Table 2 the keywords John Doe AT6374N must be received in sequential order before an output is provided from processor 10 indicating that the keywords have been detected within the message being read out of memory 12. Processor 10 may be run in a slightly different mode however. Processor 10 can provide an output indicating the presence of one of a plurality of alternative keywords. This example is shown in Table 3 above. The two alternative keywords shown in Table 3 are F116 and ECM.

With this alternative keyword mode of operation there is one memory bit in the first block of memory bits for each alternative keyword. However, to avoid mixing the second character of one keyword with the second character of another keyword, different blocks of memory bits are used for all other characters of all other alternative keywords. This is reflected in the binary words seen under the Address A1 column of Table 3. Upon the detection of the delimiter character at the end of either one of these two keywords it can be seen that there is a one output from RAM 21 as shown in the Last RAM column of Table 3. Therefore, upon the detection of either one of these two keywords within a message being read out of memory 12, the entire message will be transferred from data buffer 23 to video terminal 11 at the completion of the message in the manner described in the last paragraph. Table 3 only reflects two alternative keywords to be searched for, but a large number of alternative keywords may be searched for within a message.

The alternative keyword operation may also be mixed with the sequential keyword operation described heretofore in this specification.

In Table 3 it can be seen that when the delimiter character at the end of any one of the alternative keywords is detected only memory bit location 12 is read out of each of RAMs 15 through 21 yielding the binary word 000001 and also the one output from RAM 21. With this arrangement the operator utilizing terminal 11 gets the message for review but doesn't know which of the alternative keywords are detected in the message. In a variation of this operation, however, microprocessor 14 may be informed of the specific keyword found in the message. To accomplish this operation, and with reference to Table 3, the contents of memory locations 262 and 409 would not be 000000 as shown for the last letter of each keyword. Instead a different six bit binary number is stored in each of memory locations 262 and 409 of RAMs 15 through 20 which causes processor 10 to go to memory locations other than location 12 upon detecting the delimiter at the end of each alternative keyword. There is a different last memory location for each alternative keyword. The binary word found in these different last memory locations in response to delimiter characters following each alternative keyword identifies the specific keyword found. Microprocessor 14 responds to the one output of RAM 21 and the six bit binary word from RAMs 15 through 20 to analyze the binary word and thereby determine the specific alternative keyword found in the message. As there may be more than one keyword in a message, and there is a one output from RAM 21 following each keyword found in a message, microprocessor 14 will determine each alternative keyword detected and can be programmed to cause these keywords to be displayed on video terminal 11 above the message. In addition, the operator of terminal 11 may utilize a keyboard (not shown) to select one of the alternative keywords and then only those messages containing the selected keyword are sequentially displayed under control of the operator. In this manner the operator may review messages according to the keywords found in the messages.

My processor may also be used for other processing functions such as arithmetic functions and limit searching, both of which are described hereinafter. With the examples I give, one skilled in the art will recognize that my associative processor can be utilized to perform many other functions known in the processor art but not described herein. To attempt to describe the many processing functions that may be accomplished with my novel processor, would make this patent specification very large.

TABLE 4

| | | | Subtraction | Addition | |
|---|---|---|---|---|---|
| A1 | A2 | Memory Location | Memory Contents (A2 − A1) | Carry RAM | Memory Contents (A1 + A2) |
| 000 | 000 | 0 | 000 | 0 | 000 |
| | 001 | 1 | 001 | 0 | 001 |
| | 010 | 2 | 010 | 0 | 010 |
| | 011 | 3 | 011 | 0 | 011 |
| | 100 | 4 | 100 | 0 | 100 |
| | 101 | 5 | 101 | 0 | 101 |
| | 110 | 6 | 110 | 0 | 110 |
| | 111 | 7 | 111 | 0 | 111 |
| 001 | 000 | 8 | 000 | 0 | 001 |
| | 001 | 9 | 000 | 0 | 010 |
| | 010 | 10 | 001 | 0 | 011 |
| | 011 | 11 | 010 | 0 | 100 |
| | 100 | 12 | 011 | 0 | 101 |
| | 101 | 13 | 100 | 0 | 110 |
| | 110 | 14 | 101 | 0 | 111 |
| | 111 | 15 | 110 | 1 | 000 |
| 010 | 000 | 16 | 000 | 0 | 010 |
| | 001 | 17 | 000 | 0 | 011 |
| | 010 | 18 | 000 | 0 | 100 |
| | 011 | 19 | 001 | 0 | 101 |
| | 100 | 20 | 010 | 0 | 110 |
| | 101 | 21 | 011 | 0 | 111 |
| | 110 | 22 | 100 | 1 | 000 |
| | 111 | 23 | 101 | 1 | 001 |

Table 4 is utilized to describe the arithmetic functions of subtraction and addition utilizing my processor operating as a data driven processor. The table is not complete but is detailed enough so that the operation may easily be understood by one skilled in the art and the teaching expanded to actual applications. Columns A1 and A2 in Table 4 are the addressing inputs to the RAMs. In this brief example, there are only a total of six addressing inputs to the RAMs as represented by the three inputs under each of columns A1 and A2. In actuality there may be many more addressing inputs to RAMs such as the twelve inputs described previously in this specification for keyword search operation.

Referring now to Table 4 it may be seen that the three bit binary word input at addressing input A1 is subtracted from the three bit binary word applied to the addressing inputs A2 as shown under the subtraction (A2−A1) column. Also, the three bit binary word applied to addressing input A1 is added to the three bit binary word input to the addressing input A2 as shown under the addition (A1+A2) column. Again, the composite of the input to each of addressing inputs A1 and A2 comprises a six bit binary word which specifies a particular memory location as is shown under the memory location column. Those skilled in the art of binary arithmetic will readily understand the binary numbers appearing under the subtraction (A2−A1) and addition (A1+A2) columns of Table 4 being the difference and sum respectively of the binary numbers applied to the addressing inputs A1 and A2. The difference in operation between my processor for addition, subtraction and the previously described keyword search operation is that the output of the memory is not used to address a portion of the addressing inputs of the memory. Instead, two entirely separate inputs are applied to the addressing inputs A1 and A2 and the contents of the memory location so addressed are either the difference or the sum of the two numbers. The RAMs would have their memory locations written into prior to the operation of the processor for either the addition or subtraction function. As an alternative, read only memory (ROM's) may be permanently written into and used only for addition or subtraction. In contrast to the relatively few memory locations that are written into for the keyword search operation all memory locations are written into in the addition and subtraction functions represented in Table 4.

In the keyword search operation the last RAM was utilized to indicate the detection of a keyword or keywords within stored messages being searched. In arithmetic operations the last RAM is not utilized for this purpose. In the example of adding the binary numbers input to addressing inputs A1 and A2 the last RAM is used as a carry column for the cases in which the two three-bit numbers being added together have a sum which requires four bits. In this case the last RAM is used as a carry RAM and provides a one output only when required. For example, when the binary numbers 001 and 111 are added, the result in a four bit binary number 1000. The highest order bit of this four-bit number output is obtained from the carry RAM while the remainder of the sum is obtained from the other three RAMs. Similarly, the fourth RAM may be used as a borrow column in subtraction.

TABLE 5

| A1 | A2 | Number or Character | Limit Search 87-123 | | |
|---|---|---|---|---|---|
| | | | Memory Location | Memory Contents | Last RAM |
| 0000 | 0000-1001 | 0-9 | 0-9 | 0000 | 0 |
| | 1010-1110 | Unused | 10-14 | 0000 | 0 |
| | 1111 | Delimiter | 15 | 0001 | 0 |
| 0001 | 0000 | 0 | 16 | 0001 | 0 |
| | 0001 | 1 | 17 | 0010 | 0 |
| | 0010-0111 | 2-7 | 18-23 | 0000 | 0 |
| | 1000 | 8 | 24 | 0101 | 0 |
| | 1001 | 9 | 25 | 0110 | 0 |
| | 1010-1110 | Unused | 26-30 | 0000 | 0 |
| | 1111 | Delimiter | 31 | 0000 | 0 |
| 0010 | 0000-0010 | 0-2 | 32-34 | 0011 | 0 |
| | 0011-1001 | 3-9 | 35-41 | 0000 | 0 |
| | 1010-1110 | Unused | 42-46 | 0000 | 0 |
| | 1111 | Delimiter | 47 | 0000 | 0 |
| 0011 | 0000-0011 | 0-3 | 48-51 | 0100 | 0 |
| | 0100-1001 | 4-9 | 52-57 | 0000 | 0 |
| | 1010-1110 | Unused | 58-62 | 0000 | 0 |
| | 1111 | Delimiter | 63 | 0000 | 0 |
| 0100 | 0000-1001 | 0-9 | 64-73 | 0000 | 0 |
| | 1010-1110 | Unused | 74-78 | 0000 | 0 |
| | 1111 | Delimiter | 79 | 0001 | 1 |
| 0101 | 0000-0110 | 0-6 | 80-86 | 0000 | 0 |
| | 0111-1001 | 7-9 | 87-89 | 0100 | 0 |
| | 1010-1110 | Unused | 90-94 | 0000 | 0 |
| | 1111 | Delimiter | 95 | 0000 | 0 |
| 0110 | 0000-1001 | 0-9 | 96-105 | 0100 | 0 |
| | 1010-1110 | Unused | 106-110 | 0000 | 0 |
| | 1111 | Delimiter | 111 | 0000 | 0 |

Another use of my novel processor is to perform limit searching. That is, it may be utilized to locate a number in a range between selected high and low limit numbers. This example is represented in Table 5 above which is now described. In the example shown in Table 5 the processor is used to locate any number between the numbers 87 and 123. In the operation of the processor the output of the RAM memory is stored in holding register and is reapplied to addressing inputs A1 just as it was for the key word search operation previously described.

In this application only the numbers 0 through 9 and the delimiter character are required. Only four binary bits are necessary to represent these ten numbers and delimiter character. Accordingly, for the limit search example shown in Table 5 only four addressing bits are required for each of addressing inputs A1 and A2. This is a total of an eight-bit address to a RAM.

Initially, the processor must locate a delimiter character so that it knows that the next number input to the processor is the first digit of a number. Accordingly, the presence of a four-bit binary number between 0000 and 1001, representing the decimal characters 0 through 9, or the presence of non-utilized binary members 1010 through 1110 will both yield a 0000 output from the memory as shown under the memory contents column of Table 5. Upon the delimiter character, represented by the binary word 1111, being applied to addressing input A2 of the RAMs the fifteenth RAM memory location is addressed and the output from the RAMs is 0001 indicating that the delimiter character has been detected. This portion of the operation is identical to the key word search operation.

After the detection of a delimiter character the processor is only looking for a number, the first digit of which is obviously only 8, 9, or 1, and wishes to ignore the digits 0 and 2 through 7 as well as the unassigned binary numbers and the delimiter character. This is accomplished in the following manner. The 0001 output from the memory in response to the delimiter character is applied to the A1 addressing input of all the RAMs. From Table 5 it will be noted that in response to the next digit applied to the A2 addressing of the RAMs being a zero that the output of the RAM memory remains 0001 to maintain this input at the A1 addressing input. In this manner, the presence of zeros prefixing a number are ignored. In response to the unwanted decimal digits 2 through 7 represented by the binary words 0010 through 0111 the output of each of memory locations 18 through 23 is 0000. Similarly, the presence of an unassigned binary word and the delimiter character which are represented respectively by the binary words 1010 through 1111 also yield a 0000 output from the memory locations 26 through 31 of the RAM memory. When other than the digit 1, 8 or 9 are detected the 0000 output from the RAMs is applied to the A1 addressing inputs which causes the processor to look for the next delimiter character and ignore any subsequent numbers as they cannot possibly fall within the limits of 87 through 123.

In response to the first digit following a delimiter being a decimal one digit, the output of the seventeenth memory location is the four-bit binary number 0010. This binary number is applied via the holding register to addressing input A1 as is shown in Table 5. Logically it is recognized that the next digit that may be recognized in order to fall in the range of 87 to 123 must either be a zero, one or two. The binary word for the decimal numbers 0 through 2 are applied to the addressing input A2 and, in combination with the binary number 0010 being applied to addressing input A1, memory locations 32 through 34 are respectively read out. Memory locations 32 through 34 each yield the four-bit binary word 0011. The numbers 3 through 9 cannot occur after the number one within the limits of 87 to 123 and, if they are the next decimal digit, will yield a 0000 output from the memory as is shown in Table 5. Similarly, unassigned binary words and the delimiter character binary word will cause memory locations 42 through 47 to be addressed again yielding a 0000 output from the memory. As mentioned previously, this causes the processor to ignore any further numbers and it recommences looking for a delimiter character.

In the event the second digit applied to the addressing input A2 of my processor is one of the digits 0, 1 or 2 the output of the appropriate memory locations is the binary word 0011 which is applied to the holding register. All other digits and the delimiter character results in a 0000 output from the memory which causes the processor to recommence looking for a delimiter character again. It should be noted that the processor is operating in a modified key word search mode and digits must be spotted in a particular sequence in order to achieve an output.

In the event that the third digit received is one of the digits 0, 1, 2 or 3, which are the only possible third digits that may be received, there is an output from memory locations 48 through 51 of the binary word 0100 which is loaded into the holding register. The 0100 now in the holding register is applied to the A1 addressing inputs as mentioned previously and forms the four higher order addressing bits of the eight-bit addressing word applied to all of the RAM memories of the processor. For a third digit of four through nine, the unassigned binary words and the delimiter character, RAM locations 52 through 63 are read out yielding 0000 which causes the processor to recommence searching for a delimiter character because the number being checked is not within the limits 87 to 123. When the binary number for the decimal digits 0 through 9 and unassigned binary words 1010 through 1110 are applied to input A2 at this time there will be the binary word 0000 output from the memory as the corresponding memory locations 64 through 78 are addressed. The number being checked falls outside the preset limits. However, if the binary word 1111 representing the delimiter character is input to the A2 addressing inputs the 79th memory location is addressed and the binary word 0001 is output therefrom. At the same time, the output of the last RAM at the 79th memory location is a 1 indicating that a number between the limits 87 to 123 has been detected. The 0001 word output from the RAMs is applied via the holding register to the A1 addressing inputs so that the processor may commence looking at the next number to determine if it falls within the limits of 87 to 123.

As mentioned previously, when the first binary word applied to addressing inputs A2 following a delimiter character represents the number 8 or 9 there is an output from the 24th and 25th memory location respectively. The output from the 24th memory location is the binary word 0101 which is applied to the holding register to overwrite the contents thereof and in turn is applied to the addressing inputs A1 of the RAM memory within the processor. Looking at Table 5 to the presence of the binary word 0101 at the A1 addressing inputs the only digits that are to be recognized are the digits 7 through 9 which yield a 0100 binary word output. Numbers 0 through 6, the delimiter character and unassigned binary words all yield a 0000 binary word output from the respective memory locations read out because the number falls outside the limits. As a result any number between 87 through 89 is checked for. The 0100 binary word output from memory locations 87 through 89 again prepares the RAMs to only respond to the next character being a delimiter character as previously described with reference to Table 5 under the binary word input to the A1 addressing inputs being 0100. If the next character is not a delimiter character, the output from the RAMs is 0000 which will not result in a one output from the last RAM.

In the event the first number received after a delimiter character is the number 9, the binary word 0110 is output from memory location 25. Binary word 0110 causes the block of memory from bit 96 through bit 111 of RAMs 15 through 21 to be addressed. As any number from ninety to ninety-nine is within the preset limits there is an output from memory locations 96 through 105 for the digits 0 through 9 respectively. The binary word 0100 is output from memory locations 96 through 105 while the binary word 0000 is output from memory locations 106 through 111 for the unassigned binary word and delimiter character as the third number. In response to the 0100 word output from the RAMs processor 10 looks for a delimiter character as the next character as previously described. Any other character than the delimiter character will yield a 0000 output from memory locations 64 through 78 which causes the processor to recommence looking for a delimiter character and then check the next number.

It will be apparent from the above detailed description of the several modes of operation of my novel associative processor that it may be used to perform many other functions.

What I claim is:

1. Apparatus for processing binary information to locate predetermined sequences of characters amongst strings of characters in binary form being serially applied to an input of said apparatus from any data source comprising a memory whose multi-bit addressing input is divided into multiple portions and binary words from different sources are applied to each of the multiple portions to make up a complete memory address which causes a binary word to be read out of said memory, said binary words read out of said memory being made up of all zeros or of ones and zeros, the latter being written into said memory to indicate said predetermined sequences of characters, a register for storing ones of said binary words immediately after they are read out of said memory and applying a portion of whatever binary word is stored in said register to a first portion of said multiple portions of said memory addressing inputs to identify a block of bits in said memory said register only storing one binary word at a time and each binary word stored in said register being replaced by a subsequent binary word read out of said memory, and means for applying said serial strings of characters in binary form to a second of said multiple portions of said memory addressing inputs to be searched for said predetermined sequences of characters, said predetermined sequences of characters being determined by binary words written into said memory before said strings of characters are applied to said second portion of said memory addressing inputs, each binary word being read out of said memory indicating if the character in binary form presently being applied to said second portion of said memory addressing inputs in a character in proper character order in one of said predetermined sequences of characters.

2. The processing apparatus in accordance with claim 1 wherein said binary words applied to said second portion of said memory addressing inputs are grouped into messages that are being checked to locate said predetermined sequences of characters and further comprising a buffer memory in which each of said messages are stored while its binary words are being processed, said stored messages being read out for transfer depending upon the results of processing of its binary word content.

3. The processing apparatus in accordance with claim 2 wherein each predetermined character sequence receipt indication is a single binary bit which starts in a zero state and changes to a one state output upon the receipt of each complete character sequence.

* * * * *